(12) United States Patent
Gloriosa

(10) Patent No.: US 7,819,474 B2
(45) Date of Patent: Oct. 26, 2010

(54) ADJUSTABLE THIGH SUPPORT FOR A MOTOR VEHICLE SEAT

(75) Inventor: Melinda Gloriosa, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 310 days.

(21) Appl. No.: 12/038,094

(22) Filed: Feb. 27, 2008

(65) Prior Publication Data
US 2009/0212611 A1  Aug. 27, 2009

(51) Int. Cl.
*B60N 2/02* (2006.01)
(52) U.S. Cl. .................................... 297/337; 297/344.1
(58) Field of Classification Search ................. 297/337, 297/344.14
See application file for complete search history.

(56) References Cited

U.S. PATENT DOCUMENTS

| 4,401,343 A | 8/1983 | Schmidt |
| 4,541,669 A | 9/1985 | Goldner |
| 4,648,654 A * | 3/1987 | Voss ......................... 297/337 X |
| 4,687,251 A * | 8/1987 | Kazaoka et al. ............. 297/337 |
| 4,773,703 A | 9/1988 | Krugener et al. |
| 4,796,951 A | 1/1989 | Tamura et al. |
| 5,171,062 A | 12/1992 | Courtois |
| 5,553,920 A * | 9/1996 | Meschkat et al. ....... 297/344.14 |
| 6,244,660 B1 * | 6/2001 | Yoshimatsu ............. 297/337 X |
| 6,398,306 B1 | 6/2002 | Mack |
| 2009/0091172 A1 * | 4/2009 | Kim ....................... 297/337 X |

\* cited by examiner

*Primary Examiner*—Anthony D Barfield
(74) *Attorney, Agent, or Firm*—Mark E. Duell, Esq.; Emerson Thomson Bennett

(57) ABSTRACT

The present invention generally relates to an adjustable seat for a motor vehicle and related methods. Some embodiments relate to a seat having a thigh support insert that can be adjusted relative to a laterally-disposed bolster cushion of the seat to accommodate a variety of occupants having different heights. Some embodiments relate to methods for making a vehicle seat having an adjustable thigh support.

9 Claims, 3 Drawing Sheets

ADJUSTABLE THIGH SUPPORT FOR A MOTOR VEHICLE SEAT

BACKGROUND OF THE INVENTION

1. Field of the Invention

The present invention generally relates to an adjustable seat for a motor vehicle. Some embodiments relate to a seat having a thigh support insert that can be adjusted relative to a laterally-disposed bolster cushion of the seat to accommodate a plurality of occupants each having a different height.

2. Description of Related Art

A traditional automobile seat includes a generally horizontal seat base and a seatback coupled to the seat base at an obtuse angle for supporting an occupant of the automobile in a seated posture. The occupant of the automobile sits, facing a forward direction, upon a cushion provided to pad the seat base with the occupant's feet resting on the floor and his legs extending outward beyond a leading edge of the cushion. The seat can optionally be provided with a mechanism for horizontally adjusting the position of the seat relative to the floor of the automobile to provide the seat's occupant with sufficient leg room to at least partially extend his legs. Another mechanism for adjusting the angle between the seatback and the seat base can also optionally be provided to the seat for maximizing the comfort experienced by the occupant while in the seat.

A tall occupant having long legs will typically adjust the position of the seat toward a rear of the automobile to enlarge the leg room between a front portion of the seat cushion and a forward dashboard of the automobile cabin. Doing so allows the tall occupant to extend his legs as much as possible to enhance his comfort while riding in the automobile. By extending his legs, the tall occupant also allows his thighs to rest somewhat flat on the seat cushion, thereby providing support to an underside of the tall occupant's thighs and minimizing discomfort. However, the length of conventional seat cushions is insufficient to extend beneath the entire length of the tall occupant's thighs, causing them to extend unsupported beyond a front portion of the seat cushion. This extension of the occupant's thighs beyond the front portion of the seat cushion can lead to the occupant experiencing discomfort over a period of time.

Similarly, an automobile seat tailored to provide thigh support to a tall occupant causes discomfort to a short vehicle occupant. In such cases, the seat length is so great that the front portion of the seat cushion contacts the underside of the short occupant's knee, preventing the short occupant from becoming properly situated in the seat against the seat back.

Previous attempts to devise a vehicular seat to accommodate occupants of varying heights have focused on allowing adjustment of the length of the seat cushion. To this end, the front portions of said seats have been made adjustable, independent of the remainder of the seat cushion. The occupant can manually adjust the position of a pad forming the front portion of the seat cushion relative to the remainder of the seat cushion, thereby providing thigh support where needed. However, such a configuration leaves a gap between the adjustable pad and the rest of the seat cushion, making the occupant uncomfortable while seated in the seat.

Other attempts have focused on allowing angular adjustment of the seat cushion as a whole, undivided structure, about a transverse axis of rotation. Such configurations allow for rotation of the front portion about an axis such that said rotation elevates or lowers the front portion of the seat cushion as desired. Although this does provide support to the occupant's thighs, it limits the occupant's ability to extend his legs (i.e., establish an angle between the thigh and calf to an angle approaching 180°) while still allowing his feet to rest on the floor of the automobile's cabin.

Alternate adjustable thigh supports also allow an underlying member to be horizontally adjusted relative to the seat cushion to adjust the thigh support provided to the seat's occupant. Although such configurations coil the excess seat-cushion material to prevent it from hanging freely, these configurations utilize a complex system of compatible gears to adjust the length of the seat cushion and hold it in place when adjustment is not desired. And in addition to being complex, the gear system requires the seat's occupant to manually turn the interlocking gears, making adjustment slow and cumbersome.

Accordingly, there is a need in the art for a vehicular seat having an adjustable thigh support that is easy to use and accommodates occupants of varying heights. Some embodiments provide a vehicular seat that is readily adjusted from a retracted position to an extended position without forming a gap between a front portion of the seat cushion and the remainder of the seat cushion that could cause the seat's occupant to experience discomfort.

BRIEF SUMMARY OF THE INVENTION

The present invention includes embodiments that relate to vehicle seats. Some embodiments include one or more seat lengthening means. For example, one embodiment includes a vehicle seat, comprising: a seat back having a front face adapted to receive an occupant and defining a longitudinal axis, a back face opposing the front face, a top end, a bottom end, and at least two opposing sides; and a slidable seat base disposed at an oblique angle relative to the seat back, the seat base being adapted to be reversibly freed to slide along a straight line relative to the seat back such that the seat base can slide at least partially under the seat back.

Another embodiment relates to a process for making a vehicle seat comprising the steps of: attaching a seat frame in the motor vehicle frame; and installing a seat base in the seat frame so that the seat base is attached to the seat frame in a sliding relation.

Still another embodiment relates to a vehicle seat, comprising: a receiving means for receiving a back of a human torso; a supporting means for supporting a portion of an human occupant located below the torso; a means for extending and retracting the supporting means to provide a selected degree of support to a human occupant's thighs.

And still another embodiment relates to a vehicle seat, comprising: a first main track and a second main track positionable in a generally parallel configuration relative to the first main track; a first main slide rail and a second main slide rail spaced apart from the first main slide rail and oriented in a generally parallel configuration relative to the first main slide rail, the first and second main slide rails being slidably receivable by the first and second main tracks, wherein the first and second main slide rails are in mechanical communication with each other so that they are adapted to slide as a single body; at least one bolster frame member attached to the first main slide rail and supporting a first bolster cushion, the at least one bolster frame member comprising a bolster side frame member extending away from the first main slide rail and defining a inner face and an outer face, and a bolster cushion pan member attached to an inner face of the at least one bolster side frame member; at least one bolster frame member attached to the second main slide rail and supporting a second bolster cushion, the at least one bolster frame member comprising a bolster side frame member extending away from the second main slide rail and defining a inner face and an outer face, and a bolster cushion pan member attached to an inner face of the at least one bolster side frame member; a first bolster cushion disposed at least partially in, and supported by, the bolster cushion pan member; a second bolster cushion disposed at least partially in, and supported by, the bolster cushion pan member; a first insert track support member extending away from an inner face of the bolster side frame member; a first insert track member attached to, and supported by, the first insert track support member, the first insert track member being oriented in a direction approximately parallel to that of the first main track member; a second insert track support member extending away from an opposing face of the bolster side frame member; a second insert track member attached to, and supported by, the second insert track support member, the second insert track member being oriented in a direction approximately parallel to that of the second main track member; and a slidable seat base disposed at an oblique angle relative to a seat back, the slidable seat base comprising a cushion support member, a cushion disposed on and substantially covering a top face of the cushion support member, a pair of slide rails attached to a bottom face of the cushion support member and oriented in a generally parallel direction relative to each other and adapted to be slidably received by the first and second insert track members, the seat base being adapted to be reversibly freed to slide along a straight line relative to the seat back such that the seat base can slide at least partially under the seat back.

BRIEF DESCRIPTION OF THE DRAWINGS

The invention may take physical form in certain parts and arrangement of parts, embodiments of which will be described in detail in this specification and illustrated in the accompanying drawings which form a part hereof, and wherein.

DETAILED DESCRIPTION OF ILLUSTRATIVE EMBODIMENTS

Figure 1:
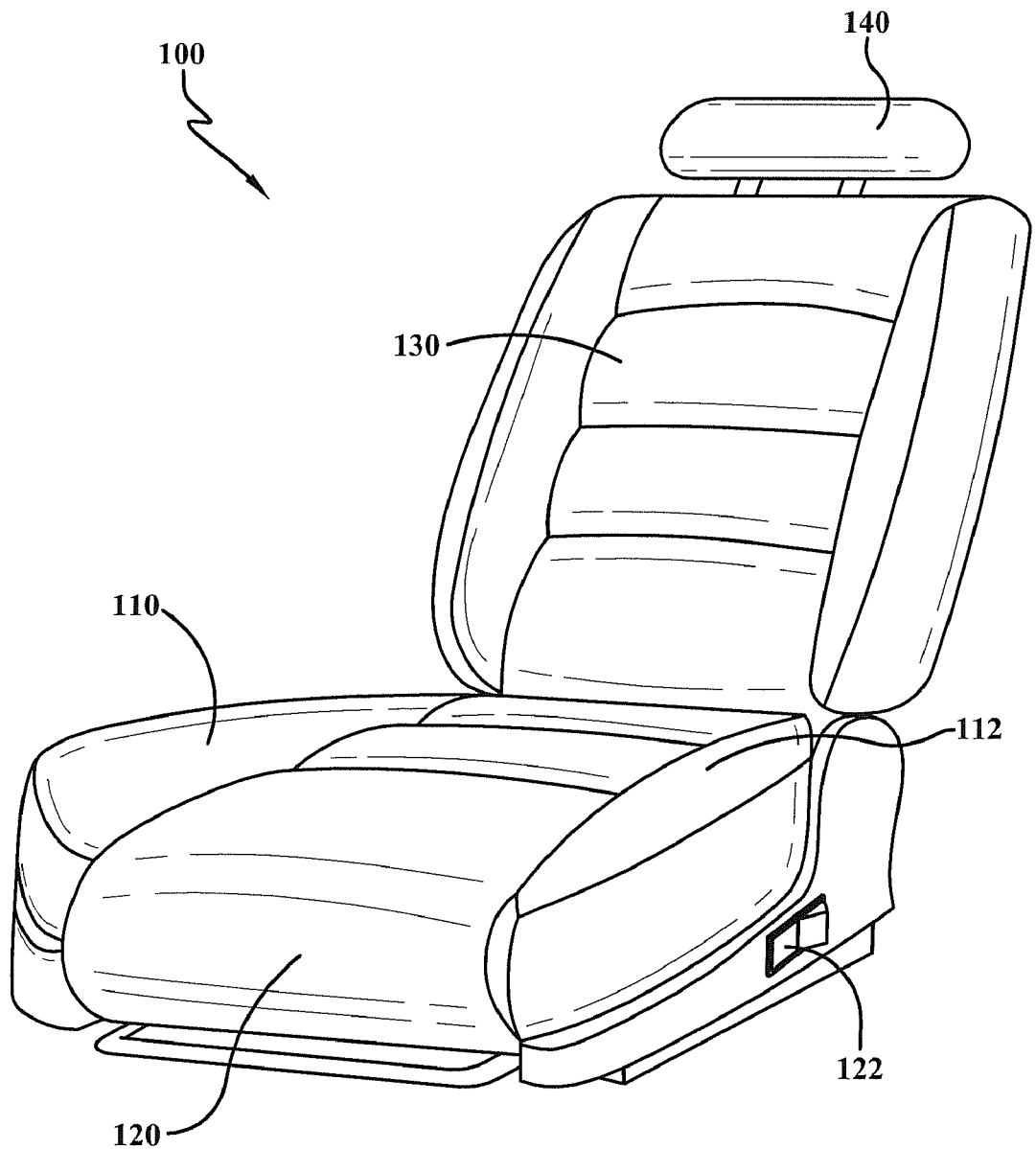
FIG. 1 is a schematic diagram of an embodiment comprising a vehicle seat.

The present invention generally relates to a means for reversibly extending a vehicle seat base so that it provides a user-selected degree of thigh support while not forming a gap between a seat base and an extension.

According to one embodiment, a vehicle seat is provided comprising a seat back and a seat base. The seat back is adapted to receive and/or support the back of a human occupant's torso, while the seat base is adapted to receive and/or support the buttocks and thighs of a human occupant. In some embodiments the seat base is in a slidable relation with the seat back, and is capable of sliding at least partially under the seat back. According to some embodiments, the slidable relation is also lockable. For example, some embodiments also provide a locking mechanism adapted to prevent the seat base from sliding while the locking mechanism is engaged. Likewise, the seat base can be freed to slide relative to the seat back by releasing the locking mechanism. According to such embodiments, the seat base can be continuously adjustable or can be adjustable in discrete steps or positions depending on the specific locking and sliding components of the embodiment. Accordingly, an occupant can adjust the seat base to provide a selected and/or desired degree of thigh support.

In some embodiments, the vehicle seat can also include one or more electric motors for power or power-assisted seat adjustment. For example, the seat base can be drivingly coupled to one or more electric motors so that the seat base can be slid by the motor along a track.

According to some embodiments, a seat base can include one or more bolster members. For example, a bolster can be disposed on either side of a central seat base insert, and can provide further support to the buttocks and/or thighs of an occupant. In some embodiments, the bolsters further widen the seat base, and also provide lateral support to the occupant. Bolsters can be in a fixed relation to the seat frame, and for example, can be attached directly to the seat frame. However, in other embodiments, the bolsters can slide with the central seat base insert.

In some embodiments the central seat base insert comprises an insert, and can be attached to the seat frame in a sliding relation. A variety of means for attaching the central seat base insert to the seat frame can be appropriate. For example, the central seat base insert can include one or more rails and/or tracks, wherein a rail slides, on and is guided by, a track. In other embodiments a rail can be held stationary while the central seat base insert slides on the rail. In some embodiments the rails can be continuously adjustable. In other embodiments the rails and/or tracks can be stepwise adjustable. In still other embodiments, a mechanism for moving the central seat member can comprise one or more screws whereby turning the one or more screws in one direction moves the central seat base insert forward, and turning the one or more screws in the other direction moves the central seat base insert backward. Some screw embodiments can also include one or more electric motors to drive the screw or screws.

Some embodiments provide for adjustable thigh support extension or cushion extension movement that is a seat function separate from the overall seat slide function. Thus, the thigh support can move forward and backward relative to the seat overall.

Referring now to the drawings wherein the showings are for purposes of illustrating embodiments of the invention only and not for purposes of limiting the same, FIG. 1 shows an embodiment comprising a vehicle seat 100. The seat 100 comprises a seat base, and a seat back 130 positioned at an oblique angle relative to the seat base. The seat base comprises a first bolster cushion 110 and a second bolster cushion 112 spaced apart in a generally parallel configuration relative to each other. The seat base also comprises an insert 120 disposed between the bolster cushions and adapted to receive the buttocks and thighs of an occupant. Furthermore, the insert 120 can be positioned using switch 122. According to this embodiment, switch 122 actuates an electric motor (not shown), which drives the insert 120 in a forward and/or backward direction, thereby providing a user-selected degree of support. Additionally, the embodiment also includes a head rest 140.

Figures 2A, 2B:
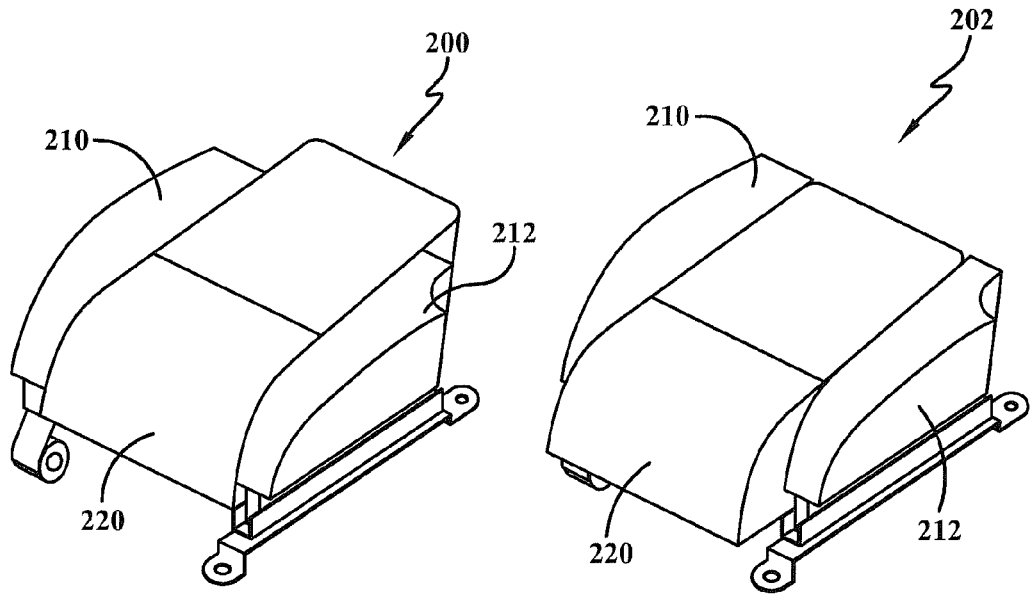
FIG. 2A is a schematic drawing of an embodiment showing the seat base in a retracted position.
FIG. 2B is a schematic drawing of an embodiment showing the seat base in an extended position.

FIG. 2A shows an embodiment comprising a seat base in a retracted configuration 200. According to this example, the seat base comprises a central seat base insert 220 having a first bolster cushion 210 disposed on one side, and a second bolster cushion 212 disposed on the other side. As shown, the central member 220 extends farther rearward than the bolster cushions 210, 212. According to this example, the bolster cushions 210 and 212 remain stationary relative to the seat frame, and only the central member 220 moves relative to the seat frame. FIG. 2B shows the same embodiment in an extended configuration 202. As shown, the central seat base insert 220 has moved in a forward direction, and the back of the central member 220 is flush with the back of the bolster cushions 210, 212.

Figures 3A, 3B:
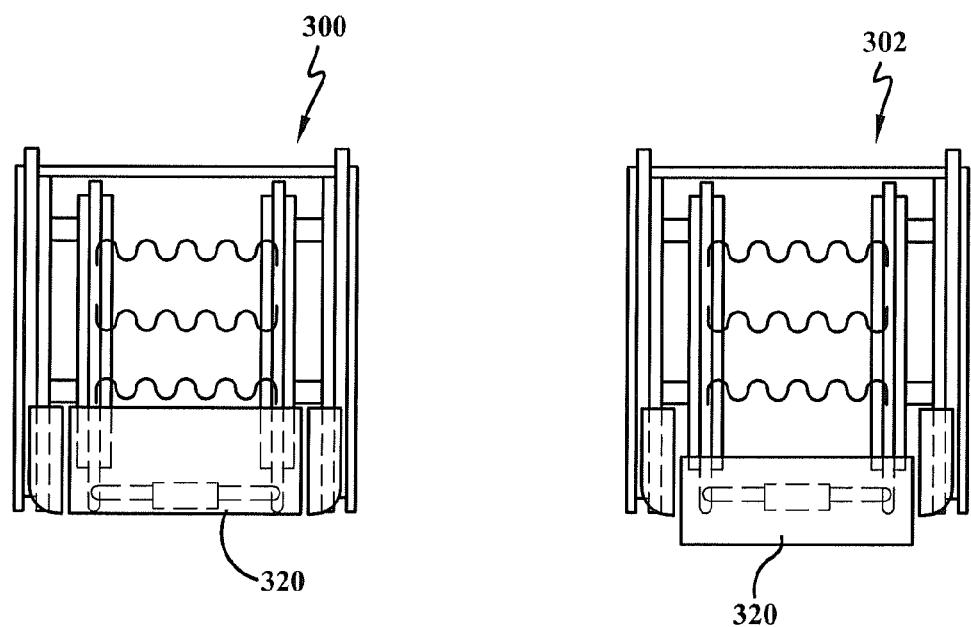
FIG. 3A is a top view (foam removed) of an embodiment showing the seat base in a retracted position.
FIG. 3B is a top view (foam removed) of an embodiment showing the seat base in an extended position.

FIG. 3A shows a top view of an embodiment in a retracted configuration 300. According to this embodiment, a central seat base insert 320 is mounted on a track and rail system. Therefore, the central member 320 is able to move in forward and backward directions relative to a seat frame 330. FIG. 3B shows the same embodiment in an extended configuration.

Figure 4:
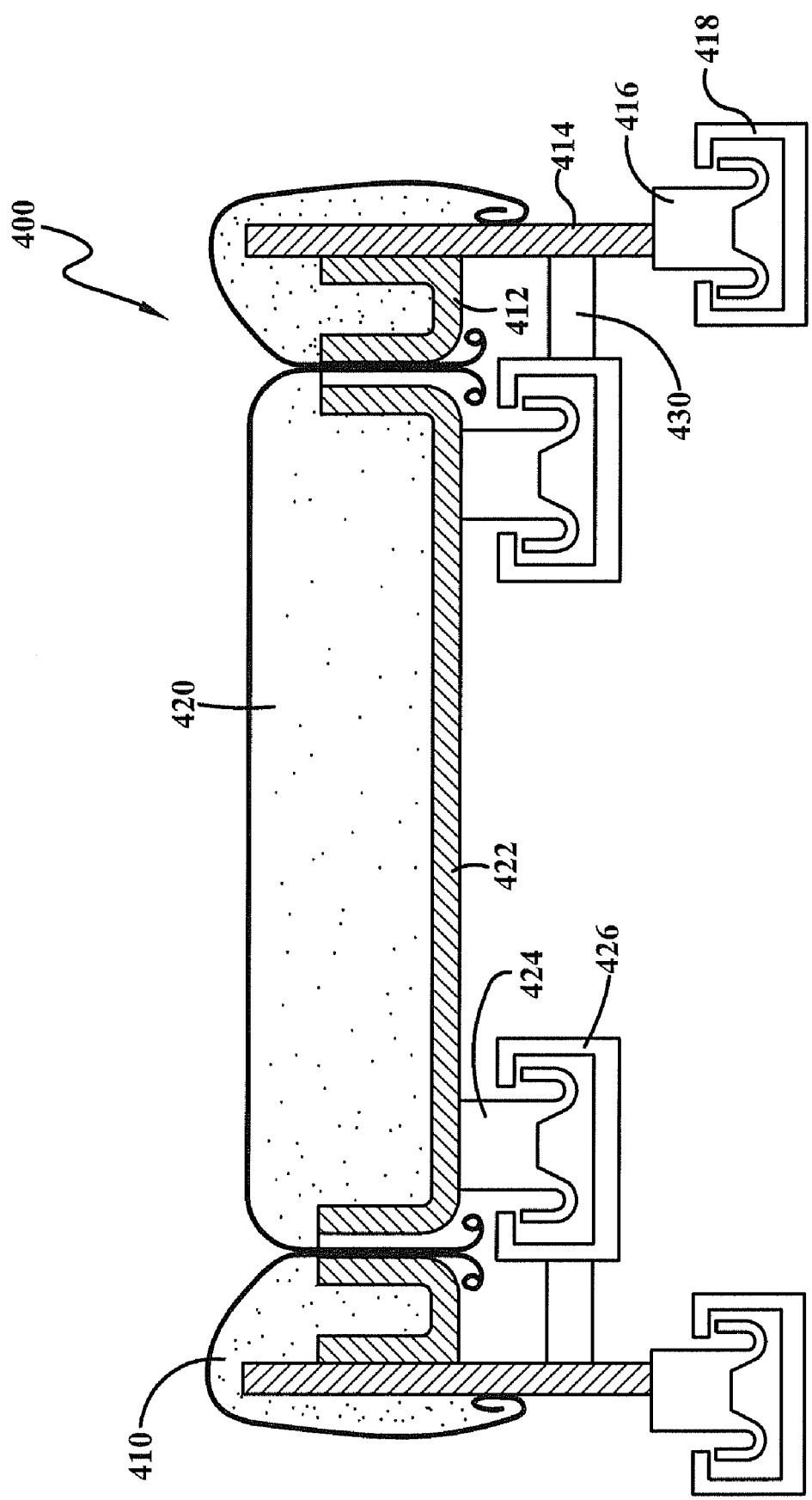
FIG. 4 is a cross sectional view of an embodiment comprising a seat base and showing a mechanism for sliding the seat base relative to the seat frame.

FIG. 4 shows a specific embodiment 400 comprising a central seat base insert having a rail and track system. According to this embodiment, a vehicle seat comprises a main pair of tracks 418 in a generally parallel orientation. The main tracks 418 are mountable to a vehicle frame, and are adapted to receive a pair of main rails 416 that serve to mount the seat frame to the vehicle frame in a sliding relation. Accordingly, an occupant is able to slide the entire seat forward and/or backward. The rails 416 support one or more bolster frame members 414 including a bolster cushion pan 412. Although this embodiment shows the bolster frame member 414 and the bolster cushion pan 412 as separate parts, in some embodiments they can comprise different portions of the same part. The bolster frame member 414 and/or cushion pan 412 can comprise a single part that wraps around from one side of the seat to the other, or they can comprise a plurality of parts. For example, each side can have its own bolster frame member 414 and/or its own cushion pan 412. A bolster cushion 410 is disposed in, and supported by, each of the one or more bolster cushion pans 412.

The embodiment shown in FIG. 4 also includes a pair of track supports 430 for a slidable insert cushion assembly. The track supports provide vertical support to a pair of insert tracks 426 on which the cushion assembly can slide. The cushion assembly comprises an insert cushion pan 422 having a top face and a bottom face. In this embodiment the insert cushion pan 422 also curves upward at the edges thereby providing lateral support, and preventing friction between the insert cushion 420 and the bolster cushions 410. The bottom face of the insert cushion pan 422 includes a pair of rails 424 arranged in a parallel configuration relative to each other and mateable with the insert tracks 426.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. A vehicle seat, comprising:
a first main track and a second main track positionable in a generally parallel configuration relative to the first main track;
a first main slide rail and a second main slide rail spaced apart from the first main slide rail and oriented in a generally parallel configuration relative to the first main slide rail, the first and second main slide rails being slidably receivable by the first and second main tracks, wherein the first and second main slide rails are in mechanical communication with each other so that they are adapted to slide as a single body;
at least one bolster frame member attached to the first main slide rail and supporting a first bolster cushion, the at least one bolster frame member comprising a bolster side frame member extending away from the first main slide rail and defining a inner face and an outer face, and a bolster cushion pan member attached to an inner face of the at least one bolster side frame member;
at least one bolster frame member attached to the second main slide rail and supporting a second bolster cushion, the at least one bolster frame member comprising a bolster side frame member extending away from the second main slide rail and defining a inner face and an outer face, and a bolster cushion pan member attached to an inner face of the at least one bolster side frame member;
a first bolster cushion disposed at least partially in, and supported by, the bolster cushion pan member;
a second bolster cushion disposed at least partially in, and supported by, the bolster cushion pan member;
a first insert track support member extending away from an inner face of the bolster side frame member;
a first insert track member attached to, and supported by, the first insert track support member, the first insert track member being oriented in a direction approximately parallel to that of the first main track member;
a second insert track support member extending away from an opposing face of the bolster side frame member;
a second insert track member attached to, and supported by, the second insert track support member, the second insert track member being oriented in a direction approximately parallel to that of the second main track member; and
a slideable seat base disposed at an oblique angle relative to a seat back, the slideable seat base comprising a cushion support member, a cushion disposed on and substantially covering a top face of the cushion support member, a pair of slide rails attached to a bottom face of the cushion support member and oriented in a generally parallel direction relative to each other and adapted to be slidably received by the first and second insert track members, the seat base being adapted to be reversibly freed to slide along a straight line relative to the seat back such that the seat base can slide at least partially under the seat back.

2. The vehicle seat of claim 1, further comprising an electric motor drivingly connected to the seat base, whereby the seat base can be slid relative to the seat back.

3. A vehicle seat of claim 1, wherein the seat base is continuously adjustable.

4. A vehicle seat of claim 1, wherein the seat base is adjustable in a discrete number of positions.

5. A vehicle seat comprising:
a first main track and a second main track positionable in a generally parallel configuration relative to each other;
a first main slide rail and a second main slide rail spaced apart from each other and oriented in a generally parallel configuration, the first and second main slide rails being slidably receivable by the first and second main tracks, wherein the first and second main slide rails are in mechanical communication with each other so that they are adapted to slide as a single body;
a first bolster member attached to the first main slide rail, the first bolster member comprising a first bolster cushion disposed on and substantially covering a top face of the first bolster member;

a second bolster member attached to the second main slide rail, the second bolster member comprising a second bolster cushion disposed on and substantially covering a top face of the second bolster member;

a first insert track member attached to the first main slide rail, the first insert track member being oriented in a direction approximately parallel to that of the first main track member;

a second insert track member attached to the second main slide rail, the second insert track member being oriented in a direction approximately parallel to that of the second main track member;

a slideable seat base disposed at an angle relative to a seat back, the slideable seat base comprising a cushion support member, a cushion disposed on and substantially covering a top face of the cushion support member, and first and second insert slide rails attached to a bottom face of the cushion support member and oriented in a generally parallel direction relative to each other;

wherein the first and second insert slide rails are adapted to be slidably received by the first and second insert track members;

wherein substantially the entire seat base can slide relative to the seat back and to the first and second bolster members, and wherein a portion of the seat base can slide at least partially under the seat back.

6. A vehicle seat of claim 5, wherein the seat base is continuously adjustable.

7. A vehicle seat of claim 5, wherein the seat base is adjustable in a discrete number of positions.

8. A vehicle seat of claim 5, wherein the seat base is placed in a locked condition to prevent the seat base from sliding and in a freed condition to allow the seat base to slide.

9. The vehicle seat of claim 5 further comprising an electric motor drivingly connected to the seat base, whereby the seat base can be slid relative to the seat back.

* * * * *